US008035575B2

United States Patent
Okabe et al.

(10) Patent No.: US 8,035,575 B2
(45) Date of Patent: Oct. 11, 2011

(54) DRIVING SUPPORT METHOD AND DRIVING SUPPORT APPARATUS

(75) Inventors: Hidefumi Okabe, Okazaki (JP); Minoru Takagi, Okazaki (JP)

(73) Assignee: Aisin Aw Co., Ltd. (JP)

( * ) Notice: Subject to any disclaimer, the term of this patent is extended or adjusted under 35 U.S.C. 154(b) by 788 days.

(21) Appl. No.: 12/073,916

(22) Filed: Mar. 12, 2008

(65) Prior Publication Data

US 2008/0239527 A1 Oct. 2, 2008

(30) Foreign Application Priority Data

Mar. 26, 2007 (JP) .................. 2007-080008
Aug. 7, 2007 (JP) .................. 2007-205672

(51) Int. Cl.
*G08G 1/017* (2006.01)
*B60R 1/02* (2006.01)

(52) U.S. Cl. .............................. 345/1.2; 340/937; 345/7
(58) Field of Classification Search .................. 340/937, 340/958, 961, 980, 973, 975; 345/1.2, 7, 345/8, 9; 348/115, 128, 148, 330.01
See application file for complete search history.

(56) References Cited

U.S. PATENT DOCUMENTS

| 6,809,704 B2 * | 10/2004 | Kulas .............................. 345/1.2 |
| 2003/0125855 A1 * | 7/2003 | Breed et al. ..................... 701/36 |
| 2003/0151563 A1 | 8/2003 | Kulas ............................... 345/7 |
| 2007/0072154 A1 * | 3/2007 | Akatsuka et al. ............... 434/69 |

FOREIGN PATENT DOCUMENTS

| DE | 10 2005 006 648 | 8/2006 |
| EP | 1 285 814 | 2/2003 |
| JP | 11-115546 | 4/1999 |
| JP | 2002-225629 | 8/2002 |
| JP | 2005-184225 | 7/2005 |
| JP | 2005-335410 | 12/2005 |

* cited by examiner

*Primary Examiner* — Amare Mengistu
*Assistant Examiner* — Stacy Khoo
(74) *Attorney, Agent, or Firm* — Bacon & Thomas, PLLC

(57) ABSTRACT

A driving support method and apparatus for displaying, on a medial side of a pillar of the vehicle, an image of an area which is hidden as a blind spot in a rear-view mirror mounted on or in a vehicle, when looking in the mirror from the driver's position and which is created by the pillar. The apparatus detects a head position of a driver, detects the angle of the rear-view mirror, calculates the area which is hidden as the blind spot on the basis of the detected driver's head position and the detected angle of the rear-view mirror, and projects an image of the area corresponding to the blind spot onto the pillar, the projected image being formed from image data which is obtained from a blind spot camera mounted on the vehicle.

10 Claims, 10 Drawing Sheets

DRIVING SUPPORT METHOD AND DRIVING SUPPORT APPARATUS

INCORPORATION BY REFERENCE

The disclosure of Japanese Patent Application No. 2007-205672 filed on Aug. 7, 2007, including the specification, drawings and abstract thereof, is incorporated herein by reference in its entirety.

BACKGROUND OF THE INVENTION

1. Field of the Invention

The present invention relates to a driving support method and a driving support apparatus.

2. Description of the Related Art

Known apparatus for supporting safe driving includes an on-board system for capturing an image of an area, hidden as a blind spot of the driver, with an on-board camera, and a display monitor for displaying the image on a display monitor. One such system captures an image of an area which is hidden as a blind spot of the driver, created by a pillar in the vehicle, with an on-board camera and displays the image on the interior side of the pillar, as disclosed in Japanese Unexamined Patent Application Publication No. 2005-184225. Such pillars are located to the front right and left of the driver and serve to support the windows and the roof of the vehicle and require a certain thickness to ensure the safety of the driver. With the known apparatus, the direction in which the camera is pointing does not necessarily coincide with the direction in which the driver is looking and therefore the image captured by the camera is converted into coordinate values not matching the direction of the driver's view.

Further, the apparatus described above does not assist the driver in viewing an area behind the vehicle or an area to the rear of the vehicle in a rear-view mirror. When the driver looks toward the area behind the vehicle or to the rear of the vehicle in the rear-view mirror, a rear pillar which is located in the back of the vehicle and/or a center pillar which is located between a front seat and a rear seat may obstruct the driver's view in the rear-view mirror.

To solve the problem described above, another apparatus projects an image onto the rear pillar and/or the center pillar and allows the driver see the projected image in the rear-view mirror. However, the driver's range of view and the driver's eye direction for such area in the rear-view mirror are different from the driver's range of view and from the driver's eye direction in looking directly at such area, so that the driver may feel some reluctance to use this method because the image projected on the pillar is significantly different from the driver's actual view.

SUMMARY OF THE INVENTION

Accordingly, it is an object of the present invention to provide a driving support method and a driving support apparatus for displaying an image of an area which is hidden as a blind spot of a driver of a vehicle, created by a pillar of the vehicle, even if the blind spot for the driver is in a rear-view mirror.

Accordingly, the present invention provides a driving support method for displaying an image of an area which is hidden as a blind spot in a mirror mounted on or in a vehicle, when looking in the mirror from the driver's position and which is created by a pillar of the vehicle, using an imaging device mounted on or in the vehicle wherein the method includes: detecting the position of the driver; detecting the angle of the mirror; calculating the area which is hidden as a blind spot in the mirror, when looking in the mirror from the driver's position, and which is created by the pillar, on the basis of the detected position of the driver and the detected angle of the mirror; and displaying an image, corresponding to the calculated blind spot area, on a medial side of the pillar, the displayed image being formed from image data captured by the imaging device.

The present invention also provides a driving support apparatus for displaying an image of an area which is hidden as a blind spot in a mirror mounted in or on the vehicle, when looking in the mirror from the driver's position, and which is created by the presence of a pillar of the vehicle; a display device for displaying an image which is provided by the imaging device on a medial side of the pillar; a driver's position detecting device for detecting the position of the driver; a mirror position detecting device for detecting the angle of the mirror which is mounted in or on the vehicle; a blind spot calculating device for calculating an area which is hidden as the driver's blind spot in the mirror, when looking in the mirror from the driver's position, and which is created by the pillar, on the basis of the detected position of the driver and the detected angle of the mirror; an image synthesis device for generating an image of the blind spot, using image data provided by the imaging device; an image outputting device for outputting the image of the blind spot; and a display device for displaying, on a medial side of the pillar of the vehicle, an image of the area hidden as the blind spot.

The driving support apparatus may further include: a range of view calculating device for calculating a range of view which the driver is able to see through the mirror on the basis of the detected position of the driver and the detected angle of the mirror, wherein the blind spot calculating device determines that a pillar is located within the calculated range of view and then calculates the area which is hidden as a blind spot of the driver of the vehicle created by the presence of the pillar and the image outputting means displays the image of the blind spot on the determined pillar.

The driving support apparatus, may further include: a vehicle condition determining device for determining a change in traffic lanes by the vehicle, wherein, responsive to a determination that the vehicle is changing traffic lanes, an image corresponding to the area which is hidden as a blind spot is output onto the pillar.

The driving support apparatus of the present invention may further include: an obstacle detecting device for detecting an obstacle which is located behind the vehicle or to the rear side of the vehicle, wherein, responsive to detection of an obstacle which is located behind the vehicle or to the rear side of the vehicle, the image synthesis device sets a virtual flat surface at the position of the obstacle to convert the image data into coordinate values.

According to the present invention, an area which is hidden as a blind spot because of a presence of a pillar in the driver's view in a rear-view mirror is calculated on the basis of the position of the driver and the angle of the rear-view mirror. Further, an image of the area which is hidden as a blind spot in the driver's view in the mirror is displayed on a medial side of the pillar, so that the area which is hidden as a blind spot of the driver may be seen when the driver looks at an area behind the vehicle in the rear-view mirror.

In the preferred embodiment wherein the present invention identifies a pillar located within a determined range of view and calculates the area which is hidden as a blind spot by the pillar identified as included within the determined range of view, if no pillar is included within the range of view within the mirror, the calculating processing and display processing of a blind spot due to a pillar may be omitted, so that the total amount of processing may be reduced.

In the preferred embodiments of the present invention wherein an image of an area which is hidden as a blind spot of a driver is displayed responsive to a detected indication that a change of lanes is imminent, when the driver views an area behind the vehicle and/or an area to the rear side of the vehicle in the mirror, it becomes possible for the driver to see another vehicle located in the area behind or to the rear side of the vehicle of the driver.

In those preferred embodiments wherein an obstacle is detected within an area behind the vehicle or within an area to the rear side of the vehicle and a virtual flat surface is set at the position of the obstacle, a clear image in which the obstacle is centered is projected onto the medial side of the pillar.

DESCRIPTION OF THE PREFERRED EMBODIMENTS

Figure 1:
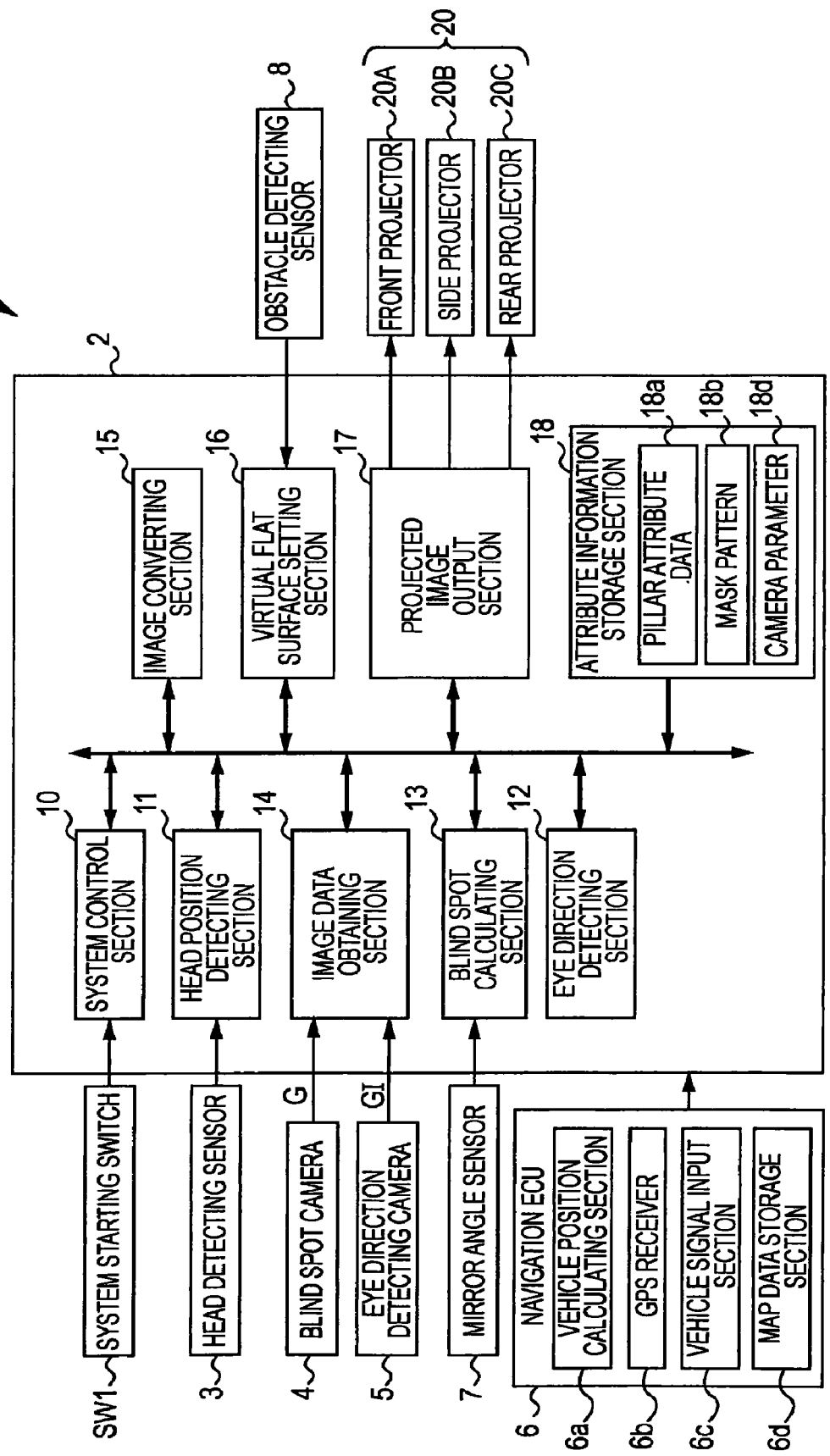
FIG. 1 is a block diagram of a driving support system according to a preferred embodiment.
Figure 2:
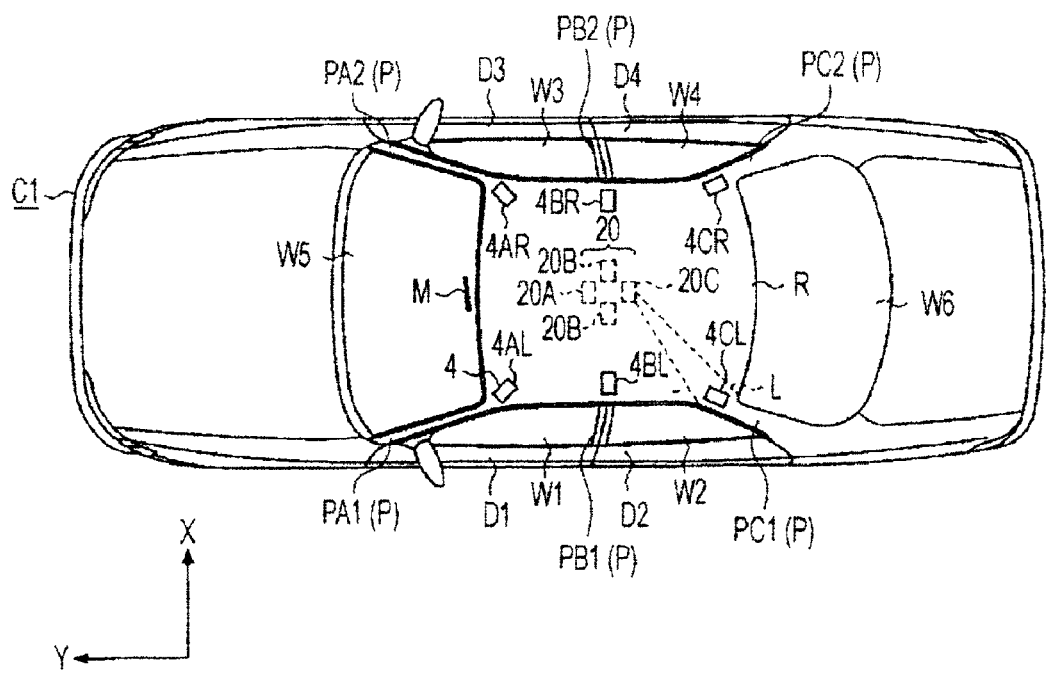
FIG. 2 is a plan view of a vehicle on which the driving support system is installed.

Preferred embodiments of the present invention will now be described with reference to FIGS. 1 through 12. FIG. 1 is a block diagram showing the structure of a driving support system 1 which is installed in a vehicle C1 (FIG. 2).

FIG. 1 shows a preferred embodiment of driving support system 1, installed in the vehicle C1, as including a driving support unit 2, a head detecting sensor 3, a blind spot camera 4 as an imaging device, an eye direction detecting camera 5, a mirror angle sensor 7, an obstacle detecting sensor 8, a navigation ECU 6, and a projector 20 ("display device" or "projecting device").

The driving support unit 2 may include a system control section 10 as vehicle condition determining means, a head position detecting section 11 as driver position detecting means, an eye direction detecting section 12, a blind spot calculating section 13 as mirror position detecting means, blind spot calculating means, and range of view calculating means, and an image data obtaining section 14. The driving support unit 2 may further include an image converting section 15 as image synthesis means and image outputting means, a virtual flat surface setting section 16 as image synthesis means, image outputting means, and obstacle detecting means, a projected image outputting section 17 as image synthesis means and image outputting means, and an attribute data storage section 18. The system control section 10 starts monitoring of an area which is hidden as a blind spot responsive to operation of switch SW 1 which is installed on an instrument panel of the vehicle C1, in or on a steering column of the vehicle C1 or in a navigation apparatus (not shown). When the vehicle C1 changes traffic lanes, the monitoring of the area which is hidden as a blind spot is likewise started. When the navigation system (ECU) 6 determines that the vehicle C1 is approaching an intersection or a curve, the navigation ECU 6 outputs a support starting signal to the system control section 10. The system control section 10, responsive to receipt of that signal, starts the monitoring of the area which is hidden as a blind spot. Alternatively or additionally, the monitoring of the area which is hidden as a blind spot may be started when the shift position of the vehicle C1 is switched to "reverse".

FIG. 1 shows the navigation ECU 6 as including a vehicle position calculating section 6a, a GPS receiver 6b, a vehicle signal input section 6c, and a map data storage section 6d. The vehicle position calculating section 6a calculates an absolute position of the vehicle C1 using the GPS receiver 6b. The vehicle signal input section 6c receives a vehicle speed pulse and a direction detecting signal from a vehicle speed sensor and/or a gyro (not shown) both of which are attached to the vehicle C1. The vehicle position calculating section 6a receives the vehicle speed pulse and the direction detecting signal from the vehicle signal input section 6c, calculates the relative location (position) of the vehicle compared to an origin location, and specifies the location of the vehicle on the basis of both of the relative location calculated as above and the absolute location which has been calculated by means of the GPS receiver 6b.

In the map data storage section 6d, route data for searching for a route to a destination and map drawing data for outputting a map on a display (not shown) are stored. A route searching section (not shown) which is included in the navigation ECU 6 searches for a route to a destination using the route data. The vehicle position calculating section 6a determines, for example, whether the vehicle C1 is approaching a predetermined point such as an intersection or a curve to be covered using route data and map drawing data and determines if the predetermined point is within an area which is hidden as a blind spot and, therefore, is a predetermined point for which driving support is to be provided.

The head position detecting section 11 receives an input of a signal from the head detecting sensor 3 and detects the head position of the driver. A plurality of the head detecting sensors 3, e.g. ultrasound sensors, are mounted surrounding a driver's seat in the vehicle. Ultrasound emitted from the head detecting sensor 3 is reflected from the head of the driver, and the time between when the ultrasound was emitted and when the reflection was received by the head detecting sensor 3 is calculated. The head position detecting section 11 calculates a relative distance to the head of the driver on the basis of the calculated time output by the head detecting sensor 3 by means of a known triangulation method.

The eye direction detecting section 12 detects eye direction of the driver. Specifically, the eye direction detecting section 12 receives an input of image data GI from the eye direction detecting camera 5 which is mounted in the vehicle. The eye direction detecting camera 5 is mounted on an instrument panel at an appropriate position and at an appropriate angle for capturing an image of the face and/or eye of the driver.

When the eye direction detecting section 12 inputs image data GI which is an image of the face and/or the eye of the driver, the eye direction detecting section 12 determines the direction of the driver's face and the position of the driver's eye, that is, the eye direction of the driver, by means of a known image processing method. For example, when the eye direction of the driver is within a predetermined angle range relative to a direction parallel to the length of the vehicle C1 (Y-arrow direction in FIG. 2), it is determined that the driver is looking at the area in front of the vehicle. When the eye direction detecting section 12 determines that the eye direction of the driver is toward a rear-view mirror M (FIG. 2), on the basis of the position of the rear-view mirror M which has been stored in advance, it is determined that the driver is looking at the rear-view mirror M. Further, for example, in the case in which the eye direction detecting camera 5, which is mounted in front of the driver, detects a side of the face of the driver by means of image processing, it is determined that the driver is looking at an area which is behind the vehicle or an area which is to the side of the vehicle.

The blind spot calculating section 13 calculates the area which is hidden as a blind spot created by the presence of a pillar P in the vehicle C1 (FIG. 2) on the basis of the detected eye direction of the driver. In the present embodiment, the vehicle C1 has six pillars P, as shown in FIG. 2: two front pillars (A pillars) PA1 and PA2, two center pillars (B pillars) PB1 and PB2, and two rear pillars (C pillars) PC1 and PC2. The front pillar PA1 is located to the left front of the driver's seat and the front pillar PA2 is located to the right front of the driver's seat. The center pillar PB1 is located between the front door D1 and the rear door D2 on the left side of the vehicle and the center pillar PB2 is located between the front door D3 and the rear door D4 on the right side of the vehicle. The rear pillar PC1 is located between the window W2 of the rear door D2 and the rear window W6 and the rear pillar PC2 is located between the window W4 of the rear door D4 and the rear window W6.

For example, when the driver faces forward, the blind spot calculating section 13 reads out pillar attribute data 18a corresponding to the two front pillars PA1 and PA2, from the attribute data storage section 18. The pillar attribute data 18a stored in the attribute data storage section 18 is three-dimensional coordinate data and shape data corresponding to the left front pillar PA1, the right front pillar PA2, the left center pillar PB1, the right center pillar PB2, the left rear pillar PC1, and the right rear pillar PC2. In other words, pillar attribute data 18a is pattern data and/or coordinate data for the outline of the pillar P. Specifically, the three-dimensional coordinates of the outline of the pillar P, i.e. points on a pillar P as coordinates for the length of the pillar P, the width of the pillar P, and the vertical.

Figure 3:
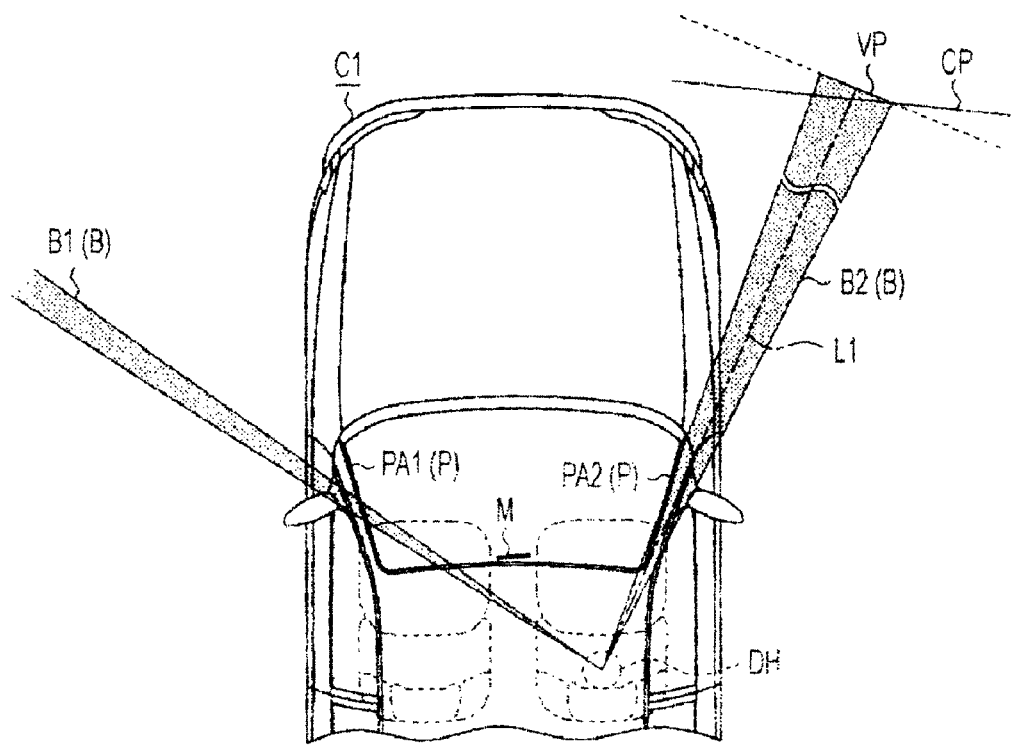
FIG. 3 is a partial plan view as in FIG. 2 showing areas hidden as blind spots to the front of the vehicle created presence of a front pillar.

The blind spot calculating section 13 receives the head position of the driver from the head position detecting section 11 and calculates areas B1 and B2 which are hidden as blind spots created by the presence of the left front pillar PA1 and the right front pillar PA2 as shown in FIG. 3, on the basis of the detected head position and the preestablished positions of the front pillars PA1 and PA2. For example, the areas B1 and B2 may be specified by connecting a center point of the head position DH and a plurality of representative points which are set on the front pillars PA1 and PA2 with straight lines or by means of another calculating method.

When the eye direction detecting section 12 determines that the driver is facing toward the rear-view mirror M, the blind spot calculating section 13 calculates each of areas which are hidden as blind spots created by the presence of the center pillars PB1 and PB2 and the rear pillars PC1 and PC2 in the rear-view mirror M. That is, when the driver looks at the rear-view mirror M, any one of or a plurality of the center pillars PB1 and PB2 and the rear pillars PC1 and PC2 may be seen in the rear-view mirror M, depending on the angle of the mirror. When at least one of the center pillars PB1 and PB2 and the rear pillars PC1 and PC2 is viewable in the rear-view mirror M from the detected head position, the blind spot calculating section 13 calculates the area(s) which is/are hidden as a blind spot created by the presence of the pillar(s) P in the mirror view.

Figure 4:
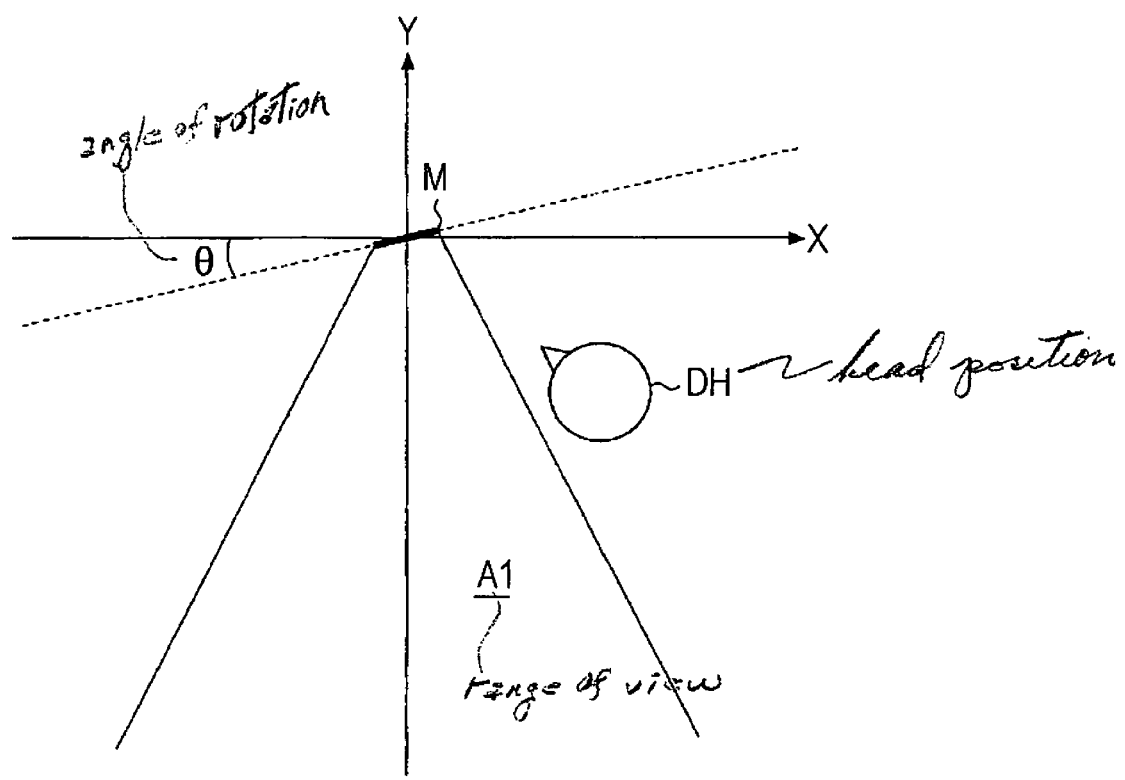
FIG. 4 is a diagram of a range of view of a rear-view mirror.

The blind spot calculating section 13 obtains the angle of the rear-view mirror M from the mirror angle sensor 7 (FIG. 1). The mirror angle sensor 7 is attached to an angle adjusting section of the rear-view mirror M and detects an angle of rotation $\theta$ relative to an axis that is parallel to the vehicle width (X-arrow in FIG. 4) as shown in FIG. 4. The mirror angle sensor 7 further detects a declination angle $\phi$ (not shown), which is the angle (slope) relative to the vertical, of the rear-view mirror M.

The blind spot calculating section 13 calculates a range of view A1 which is an area the driver is able to see in the rear-view mirror M on the basis of the angle of rotation $\theta$ and the declination angle $\phi$, both of which are obtained from the mirror angle sensor 7. That is, as shown in FIG. 4, the blind spot calculating section 13 obtains the head position DH of the driver, and calculates, for example, the maximum incidence angle and the minimum incidence angle at which the driver's eye intersects the plane of the rear-view mirror M, on the basis of the driver's head position DH, the angle of rotation $\theta$ of the rear-view mirror M, and the declination angle $\phi$ of the rear-view mirror M. Then, finally, the range of view A1 which is the area the driver is able to view in the mirror M from the calculated head position DH is calculated. Thus, the range of view A1 will change depending on the head position DH. For example, even if the angle of the rear-view mirror M is preset for the driver to see the same view as the actual view which would be seen by turning to look directly through the rear window W6, if the head position DH moves in the direction of the right front door D3 (the direction of the X arrow in FIG. 4), the incidence angle of the driver's eye direction relative to the rear-view mirror M becomes smaller and the range of view A1 moves a little to the left (in the direction opposite the X arrow). Note that, the blind spot calculating section 13 may store the range of view A1 of the rear-view mirror M on the basis of an initial position of the rear-view mirror M and change the range of view A1 at the initial mirror position according to change of the head position DH. When the rear-view mirror M has a convex mirror whose radius of curvature is relatively large, the blind spot calculating section 13 may calculate the range of view A1 taking into consideration the presence and radius of curvature of that convex mirror.

Figure 5:
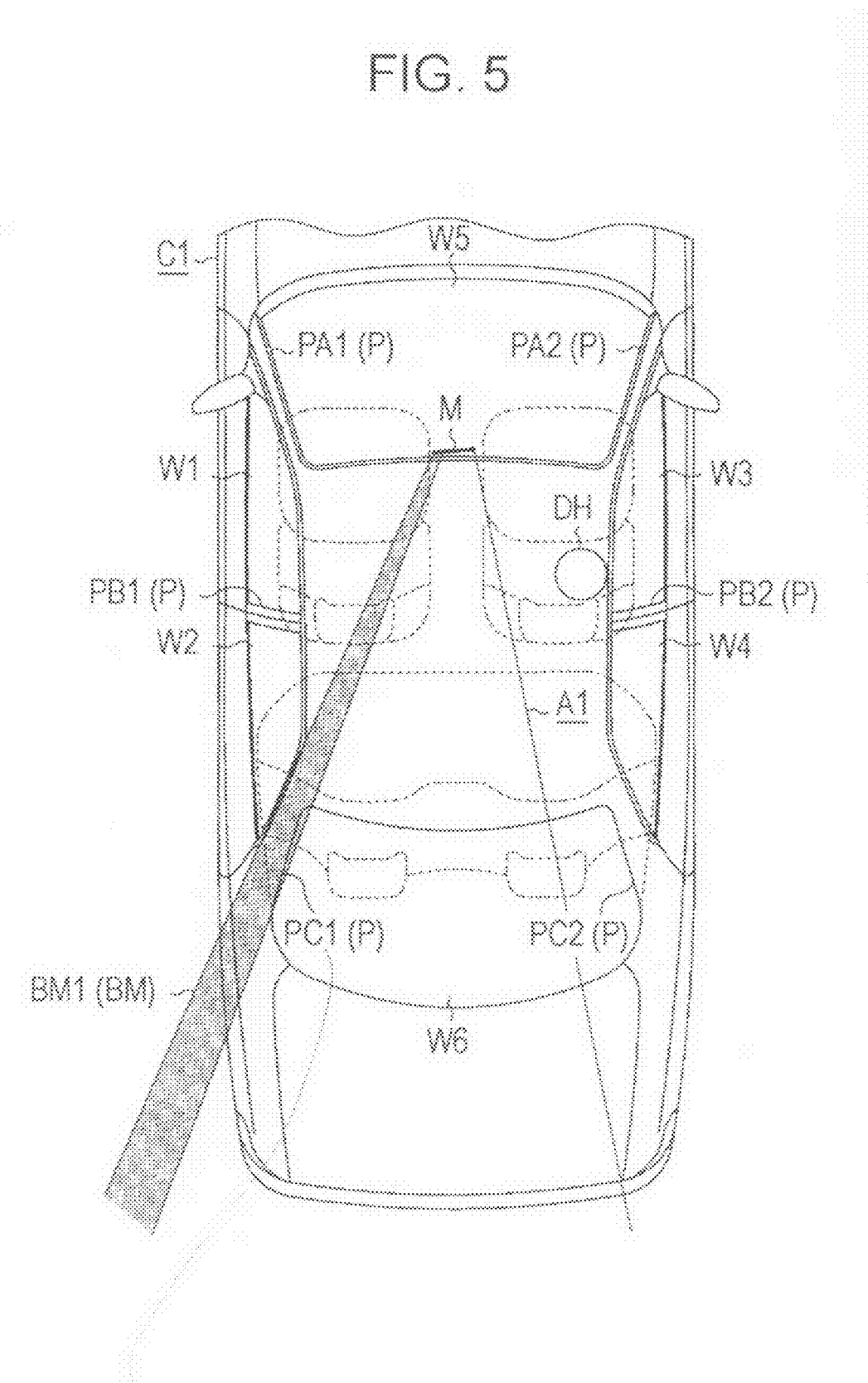
FIG. 5 is a partial plan view showing an area to the rear which is hidden as a blind spot in the rear-view mirror because of a presence of a pillar in the rear-view mirror.

The blind spot calculating section 13 further determines whether at least a part of the center pillars PB1, PB2, and the rear pillars PC1, PC2 is included within the range of view A1 of the rear-view mirror M. As described above, when the driver's head position DH moves slightly to the right, away from the normal position (in the direction of the X arrow in FIG. 4), the range of view A1 moves to the left (in the direction opposite the X arrow in FIG. 4), so that the left rear pillar PC1 may be included within the range of view A1. In this case, as shown in FIG. 5, the blind spot calculating section 13 calculates an area BM which is hidden as a blind spot in the rear-view mirror M created by the left rear pillar PC1, on the basis of both the head position DH and the pillar attribute data 18a. For example, the blind spot calculating section 13 connects a plurality of representative points, which are set on the left rear pillar PC1, and a driver's virtual eye point, which is set on the upper side of the rear-view mirror M or inside of the rear-view mirror M, with straight lines and the area between those straight lines is set as the area BM1 which is hidden as a blind spot in the mirror. Of course, the area BM which is hidden as a blind spot in the mirror may be calculated using another calculating method, on the basis of the driver's eye direction and the head position DH.

Figure 6:
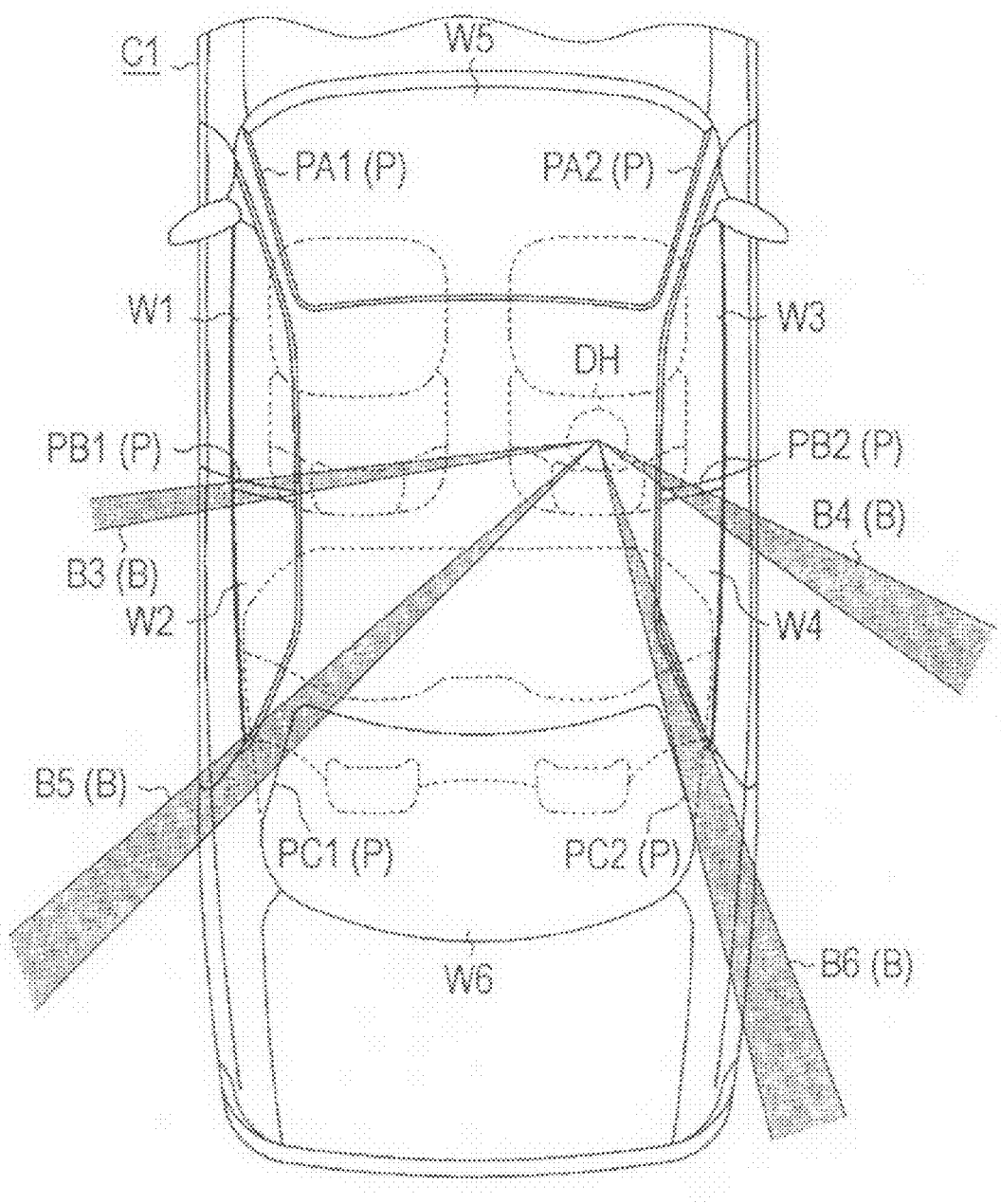
FIG. 6 is a partial plan view similar to FIG. 2 showing areas hidden as blind spots in the rear view mirror because of side pillars and rear pillars.

When the eye direction detecting section 12 determines that the driver is looking directly backward without using the mirror, as shown in FIG. 6, the blind spot calculating section 13 calculates an area B which is hidden as a blind spot created by the presence of the center pillars PB1, PB2, and the rear pillars PC1, PC2. For example, the blind spot calculating section 13 may obtain the head position DH from the head position detecting section 11 and determine areas B3 through B6, which are hidden as blind spots, by connecting the head position DH and a plurality of representative points, which are set on the center pillars PB1, PB2 and the rear pillars PC1, PC2, with straight lines.

The virtual flat surface setting section 16 sets a virtual flat surface VP to convert image data G, which has been obtained by the image data obtaining section 14, into coordinate values. For example, when the driver is looking directly forward, as shown in FIG. 3, the virtual flat surface VP is set at a certain position which is in front of the vehicle C1 and which is a predetermined distance away from the vehicle C1. For example, the virtual flat surface VP is set at a position at which the virtual surface VP intersects at right angles a center line L1 of the area B2 which is hidden as a blind spot. Note that only the virtual flat surface VP for projecting an image of the blind spot on the right front pillar PA2 is shown in FIG. 3, as a matter of convenience. However, in fact, two of the virtual flat surfaces VP are set, one each for the area B1 corresponding to the front pillar PA1 and for the area B2 corresponding to the front pillar PA2.

Figure 7:
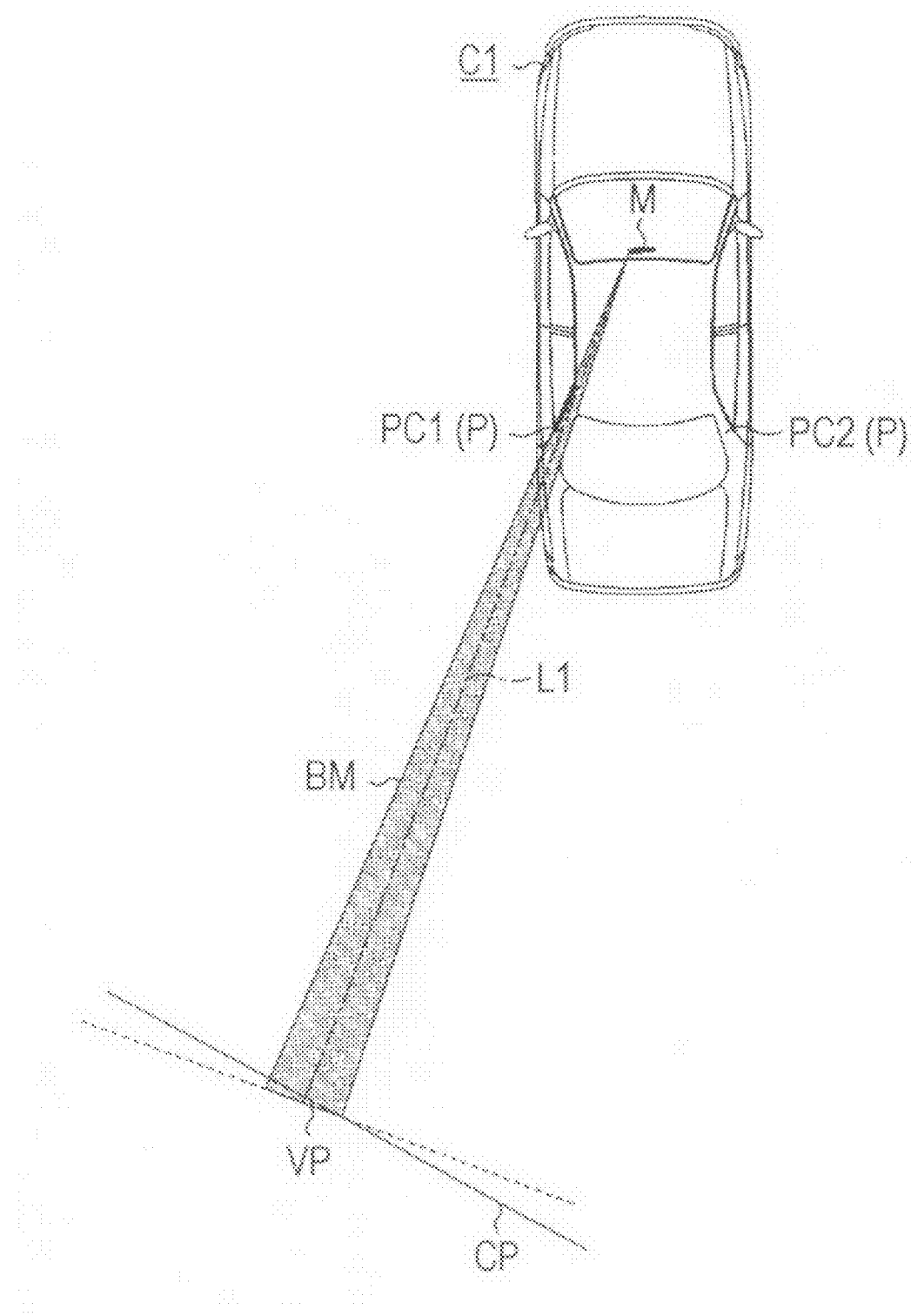
FIG. 7 is a plan view illustrating a virtual flat surface set in an area photographed by a camera.

When the driver looks at the area behind the vehicle or at the area to the rear side of the vehicle by using the rear-view mirror M, as shown in FIG. 7, the virtual flat surface VP is set at a position which is behind the vehicle C1 and is a predetermined distance away from the vehicle C1. Alternatively, the virtual flat surface setting section 16 may obtain a position of a reference object, such as a pedestrian crossing which is painted on a road surface at an intersection, from the navigation ECU 16 and set the virtual flat surface VP at the position of the reference object.

Figure 8:
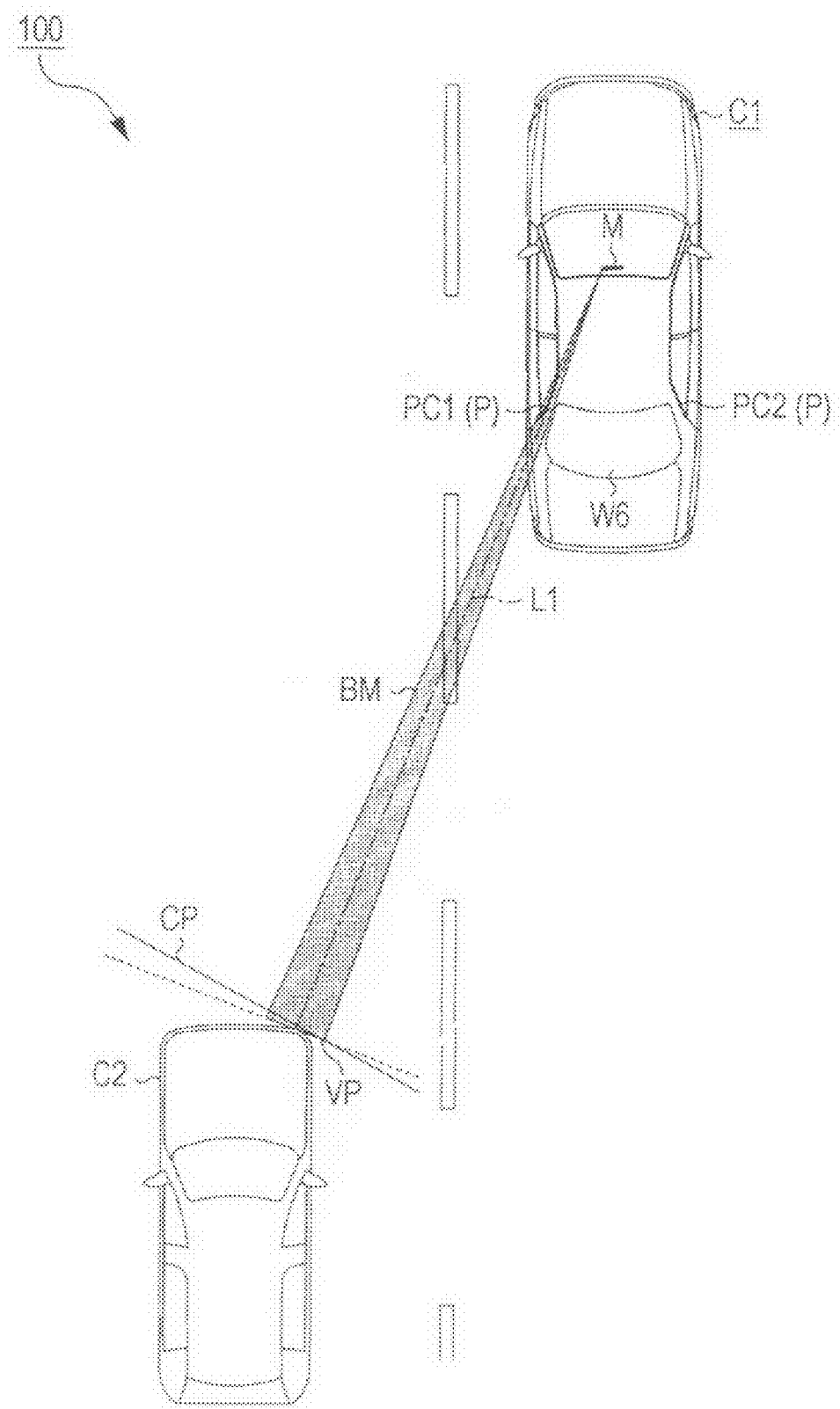
FIG. 8 is a plan view illustrating a virtual flat surface set in the area photographed by the camera when the vehicle changes traffic lanes.

When the vehicle C1 changes traffic lanes, the virtual flat surface setting section 16 sets the virtual flat surface VP at the position of another vehicle C2 (an example of an "obstacle") (FIG. 8) which is approaching the vehicle C1 from behind. Specifically, it is determined whether a change traffic lanes by vehicle C1 is imminent, on the basis of a direction change signal which is received from a direction indicator of the vehicle C1 by the system control section 10 and the navigation ECU 6. When it is determined that the vehicle C1 is to change traffic lanes, the virtual flat surface setting section 16 obtains a signal from the obstacle detecting sensor 8 (FIG. 1) and determines whether another vehicle C2 is behind vehicle C1 or to the rear side of the vehicle C1. The obstacle detecting sensor 8 is a millimeter wave radar or a sonar and is mounted on the rear side of the vehicle. When there is another vehicle C2 behind the vehicle C1 or to the rear of the vehicle C1, the virtual flat surface setting section 16 calculates the relative distance between the vehicle C1 and the other vehicle C2 and sets the virtual flat surface VP at a predetermined point on the other vehicle C2 as shown in FIG. 8. Because the virtual flat surface VP has been thus set, it is possible to project an image of the other vehicle C2 onto the pillar P without being misaligned from an actual view of the other vehicle C2 through the rear window W6, i.e. a projected image which is not twisted.

The virtual flat surface setting section 16 further determines the area to be photographed by the camera CP on the basis of the position of the virtual flat surface VP. The area determined to be photographed by the camera CP, in turn, determines the focal point for the blind spot camera 4. The image data G which is a captured image of the area focused on and photographed by the camera CP is converted into coordinate values on the virtual flat surface VP, so that the virtual flat surface setting section 16 sets the area photographed by the camera CP at a point which is close to the virtual flat surface VP and within the area which is hidden as a blind spot B2. In FIG. 3 and FIG. 7, the area photographed by the camera CP is set to extend through a range which is a section centered a mirror blind spot area BM within the virtual flat surface VP.

The image data obtaining section 14 obtains the image data G from each of the blind spot cameras 4 mounted on the vehicle C1. As shown in FIG. 2, according to the illustrated embodiment, the six blind spot cameras 4 are mounted on the vehicle C1 in positions corresponding to the six pillars P. As shown in FIG. 2, a left front camera 4AL is mounted near the left front pillar PA1 and a right front camera 4AR is mounted near the right front pillar PA2, so that the two cameras may capture images of the areas which are hidden as blind spots by the front pillars PA1 and PA2. A left side camera 4BL is mounted near the left center pillar PB1 and a right side camera 4BR is mounted near the right center pillar PB2, so that the two cameras may capture images of areas which are hidden as blind spots by the center pillars PB1 and PB2. Likewise, a left rear camera 4CL is mounted near the left rear pillar PC1 and a right rear camera 4CR is mounted near the right rear pillar PC2, so that the two cameras may capture images of areas which are hidden as blind spots by the rear pillars PC1 and PC2.

After obtaining the position of the area to be photographed by the camera CP from the virtual flat surface setting section 16, the image data obtaining section 14 controls the corresponding blind spot camera 4 to capture an image, focusing the camera CP on the determined position of the area to be photographed and outputting the captured image to the image converting section 15.

Camera parameter data 18d (FIG. 1), indicating the positions and angles of the blind spot cameras 4, is stored in the attribute data storage section 18.

The image converting section 15 obtains the image data G, which is captured by the blind spot camera 4, from the image data obtaining section 14. The image converting section 15 further obtains the blind spot area B or the mirror blind spot area BM from the blind spot calculating section 13. The image converting section 15 generates images of the blind spots which correspond to the blind spots B and BM from the obtained image data G and converts the blind spot images into coordinate values on the virtual flat surface VP which has been set by the virtual flat surface setting section 16. The coordinate conversion is a process which converts pixel data of the blind spot image into pixel data for the virtual flat surface VP.

The image converting section 15 converts the image, which has been projected on the virtual flat surface VP once, so that it is projected onto the surface (especially including the medial surface) of the pillar P. The part of the surface of the pillar onto which the image is projected may be set on the basis of the 3D coordinates of the pillar attribute data 18a.

Next, in preparation for projection of the image, which has been converted for the surface of the pillars by each of the projectors 20, the image is subjected to coordinate conversion on the basis of the position of the projector 20. As shown in FIG. 2, the four projectors 20 are located near the center of the roof interior of the vehicle C1, facing the four different pillars P to project images onto the medial surfaces of the pillars P.

That is, the image displayed on an medial surface Pa is twisted, enlarged, or narrowed depending on the incident angle of light which is output from the projector 20 onto the medial surface of the pillar P. Therefore, for example, a correlation (table or map) between coordinates of each pixel of the converted image to be projected and coordinates of each pixel of the image which is output from the projector 20 is stored in advance in an internal memory of the image converting section 15. Thus, the converted image to be projected is converted into coordinate values as the image which is output from the projector 20 on the basis of the prestored correlation.

Figure 9:
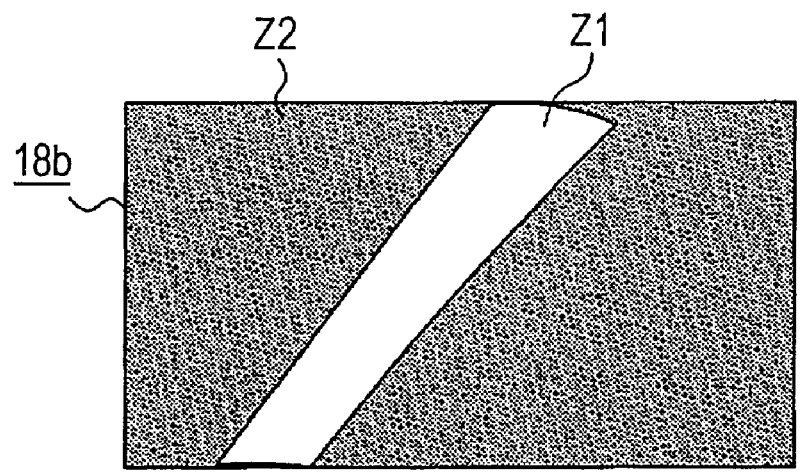
FIG. 9 is a diagram of a mask pattern.

The image which has been converted into coordinate values by the image converting section 15 is output to the projected image outputting section 17. The projected image outputting section 17 generates images of blind spots which are output from each of the projectors 20 utilizing the mask pattern 18b which is read out from the attribute data storage section 18. As shown in FIG. 9, the mask pattern 18b is data for masking the blind spot image and includes an image display range Z1 which is located along the medial outline of the pillar P and a mask Z2. The projected image outputting section 17 generates data limited to that projected as a blind spot image on the pillar P by reading the blind spot image data for the image display range Z1. By reading data for an area corresponding to the mask Z2, the image from the projector 20 does not include the masked-out area. After generating such projection data, the projected image outputting section 17 outputs the projection data to each of the projectors 20.

Note that in the illustrated embodiment, the vehicle C1 is equipped with a front projector 20A, two side projectors 20B, and a rear projector 20C. The front projector 20A is mounted to project images onto the surface of either of the front pillars PA1 and PA2. The side projectors 20B are mounted to project images onto the surfaces of the center pillars PB1 and PB2, respectively, and the rear projector 20C is mounted to project images onto the surface of either of the rear pillars PC1 and PC2. Thus, in this embodiment, four projectors 20 are utilized. However, if one projector is able to project images onto the surface of any of a plurality of the pillars P, the vehicle may have only one projector. Alternatively, the vehicle may have a plurality of projectors other than four.

Figure 10:
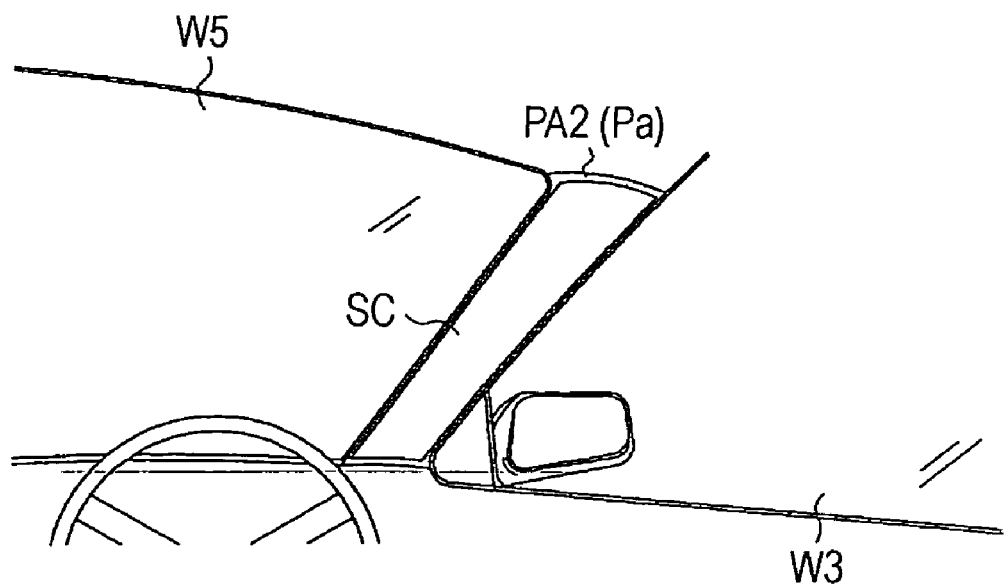
FIG. 10 is a front view of a screen attached to a front pillar.

As shown in FIG. 10, screens SC are fixed on the medial surfaces Pa of the pillars P, being fitted to the shapes of the pillars P. A focal point of each of the projectors 20 is adjusted to the screen SC which is fixed on the pillar P. However, if the medial surface Pa of the pillar P is made of a material which is able to display a clear image output from the projector 20, i.e. when the medial surface Pa of the pillar P is smooth enough to display such a clear image, the screen SC may be omitted.

As shown in FIG. 2, the projector 20 projects the image onto the screen SC by outputting light L toward the screen SC on the pillar P. No image is projected onto windows surrounding the screen SC because the image is cropped by the mask Z2 of the mask pattern 18b. When the driver looks directly at the area in front of the vehicle C1 or the area behind the vehicle, the driver will have a view of such areas unobstructed by the pillars P because of the images which are projected onto the pillars P. Likewise, when the driver looks at the area behind the vehicle and the area to rear side of the vehicle through the rear-view mirror M, the images corresponding to the driver's eye direction are projected onto the pillars P, so that the driver may view, in the rear-view mirror M, images of the areas which are hidden as blind spots, created by the pillars, in the rear-view mirror M on the surface of the pillars P.

Figure 11:
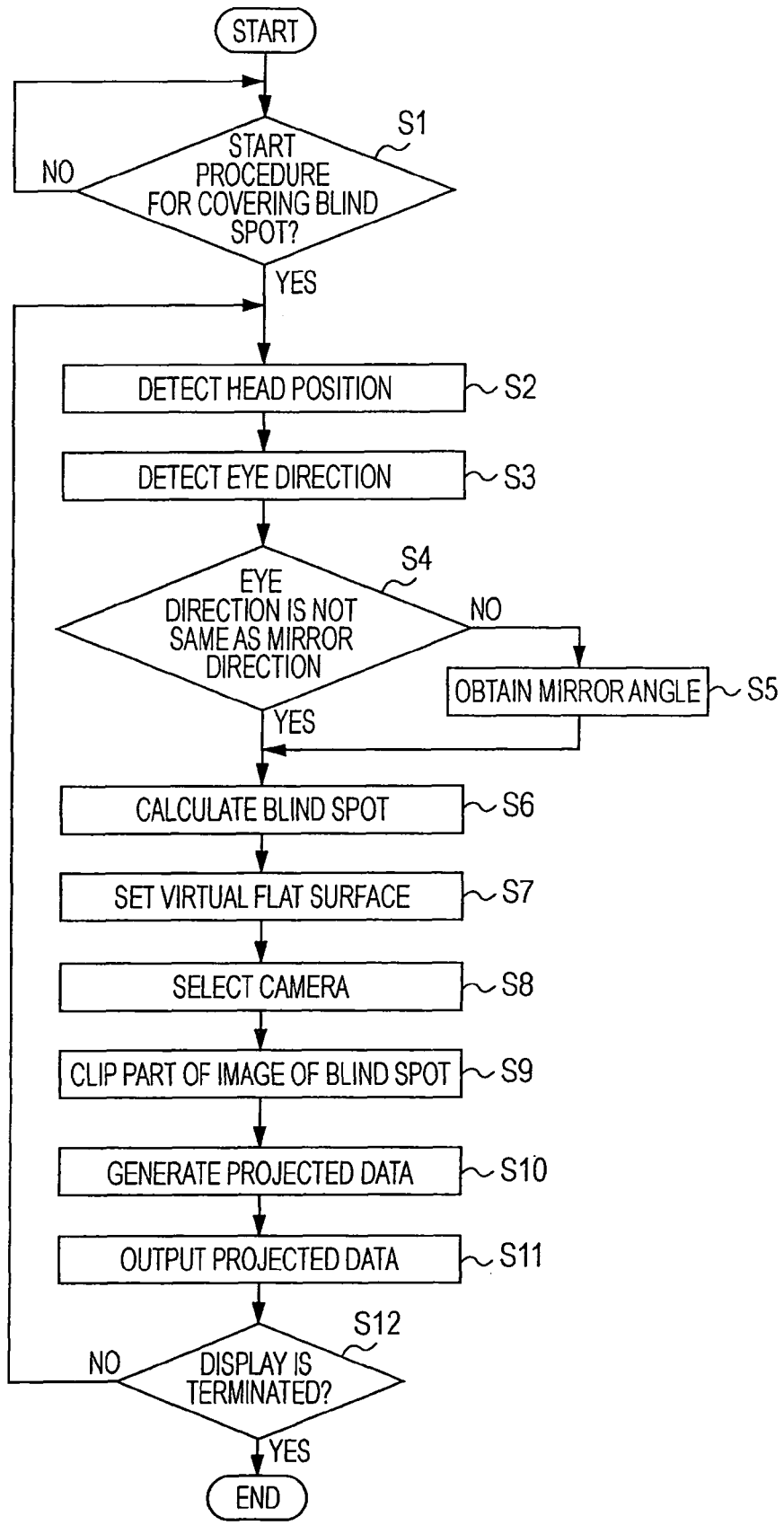
FIG. 11 is a flowchart of a preferred embodiment of the method of the present invention.

Next, an embodiment of the method of the present invention will be described with reference to FIG. 11. First, the system control section 10 determines whether a procedure for covering a blind spot should be started (Step S1). The system control section 10 determines that the procedure for covering a blind spot should be started when the system start switch SW1 is operated, when the navigation ECU 6 detects that the vehicle C1 will change traffic lanes, or when the navigation ECU 6 determines that the vehicle C1 is approaching an intersection or a curve. In addition or alternatively, the procedure for covering a blind spot may be started when the vehicle C1 is shifted into reverse. Another option is to start the procedure for covering a blind spot when the driver's eye direction has moved a predetermined angle away from the travel direction of the vehicle.

When the system control section 10 determines that the procedure for covering a blind spot should be started (Step S1=YES), the system is activated and initialized, and the driver's head position is detected (Step S2). The head position detecting section 11 receives a signal from the head detecting sensor 3 and calculates the driver's head position DH.

The eye direction detecting section 12 detects the driver's eye direction (direction of sight) (Step S3) and determines whether the driver's eye direction faces in any direction other than toward the rear-view mirror M (Step S4). As described above, for example, when the driver's eye direction is within a predetermined angle range whose center is the travel direction of the vehicle C1, i.e. the rear to front or front to rear direction of the vehicle C1, it is determined that the driver is facing forward. Conversely, when the driver's eye direction is not within the predetermined angle range, that is, when the driver faces the rear of the vehicle, it is then further determined whether the driver's eye direction is within a predetermined angle range whose center is a line extending in reverse from the travel direction of the vehicle C1. When the driver's eye direction is within the predetermined angle centered on the reverse extending line, it is determined that the driver is looking at the area behind the vehicle. When the angle of elevation of the driver's eye direction is equal to or greater than a predetermined angle and when the driver's eye direction is toward the rear-view mirror M, it is determined that the driver is looking in the rear-view mirror M.

In Step S4, when it is determined that the driver's eye direction is toward the rear-view mirror M (Step S4=NO), the blind spot calculating section 13 obtains the mirror angle including the angle of rotation θ and the declination angle φ from the mirror angle sensor 7 (Step S5). When the driver's eye direction is any direction other than toward the rear-view mirror M (Step S4=YES), the procedure goes to Step S6.

In Step S6, the blind spot calculating section 13 calculates the area which is hidden as a blind spot by the presence of the pillar P, on the basis of the driver's eye direction (Step S6). When it is determined in Step S3 that the driver is facing forward, the pillar attribute data 18a of the front pillars PA1 and PA2 is read out from the attribute data storage section 18 and the coordinates of the areas B1 and B2 which are hidden as blind spots by the front pillars PA1 and PA2 are calculated as shown in FIG. 3.

When it is determined in Step S3 that the driver is looking backward, the blind spot calculating section 13 reads out the pillar attribute data 18*a* corresponding to the center pillars PB1 and PB2 and the rear pillars PC1 and PC2 from the attribute data storage section 18 and calculates the coordinates of the areas B3 through B6 which are hidden as blind spots by those pillars as shown in FIG. 6.

When it is determined in Step S3 that the driver is looking toward the rear-view mirror M, the blind spot calculating section 13 calculates the range of view A1 which is an area the driver is able to view in the rear-view mirror M on the basis of the mirror angle and the driver's head position DH which have been obtained in Step S5. Then it is determined whether one or more of the center pillars PB1 and PB2 and the rear pillars PC1 and PC2 is/are included within the range of view A1. Further, a blind spot area in the mirror BM which is hidden as a blind spot in the mirror by the pillar(s) within the range of view A1 is calculated on the basis of the pillar attribute data 18*a*.

After the blind spot area B or the blind spot area in the mirror BM is calculated, the virtual flat surface setting section 16 sets a virtual flat surface VP on the basis of the driver's eye direction and the mirror angle as described above (Step S7). That is, the virtual flat surface VP is set at a position which is a predetermined distance away from the vehicle C1, at the position of a reference object such as a pedestrian crosswalk, or at the position of the other vehicle C2 traveling behind the vehicle C1. The virtual flat surface setting section 16 further sets the position of the area to be photographed by the camera CP, on the basis of the position of the virtual flat surface VP, and outputs the set position to the image data obtaining section 14.

The image data obtaining section 14 selects one camera to receive the image data G on the basis of the eye direction detected by section 12 and obtains the image data G which is the image of the area which is hidden as a blind spot by the presence of the pillar P (Step S8). When the driver looks forward, the image data G is obtained from the front cameras 4AL and 4AR. When the driver looks backward, the image data G is obtained from the side cameras 4BL and 4BR and the rear cameras 4CL and 4CR. When the driver looks at the area behind the vehicle C1 and to the rear side of the vehicle C1 through the rear-view mirror M, the image data G is obtained from the blind spot camera(s) 4 which corresponds/correspond to the pillar(s) P included within the range of view A1 of the rear-view mirror M.

After the image data G is obtained, the image converting section 15 clips part of the image to obtain (isolate) the blind spot area B or the blind spot area in the mirror BM which was calculated in Step S6 from the image data G (Step S9). The image converting section 15 then generates projection data, i.e. data to be output to the projector 20 (Step S10). Specifically, as described above, the image converting section 15 converts the image of the blind spot by projecting it on the virtual flat surface VP and the image is further converted on the basis of the position and the 3D shape of the pillar P targeted for projection of the image. One projector 20 is selected to project the image onto the target pillar P and the image is converted into coordinate values in accordance with the position of the selected projector 20. The projected image outputting section 17 reads the image which has been converted into coordinate values in the image display range Z1 of the mask pattern 18*b*.

After the projection data is generated, the projected image outputting section 17 outputs the projection data to the selected projector 20 (Step S11). When the driver looks forward, the projection data is output to the front projector 20A. When the driver looks backward, the projection data is output to the side projector 20B and the rear projector 20C. When the driver looks at the area behind the vehicle C1 or to the rear side of the vehicle C1 through the rear-view mirror M, the projection data is output onto the pillar P which corresponds to the driver's eye direction.

Figure 12:
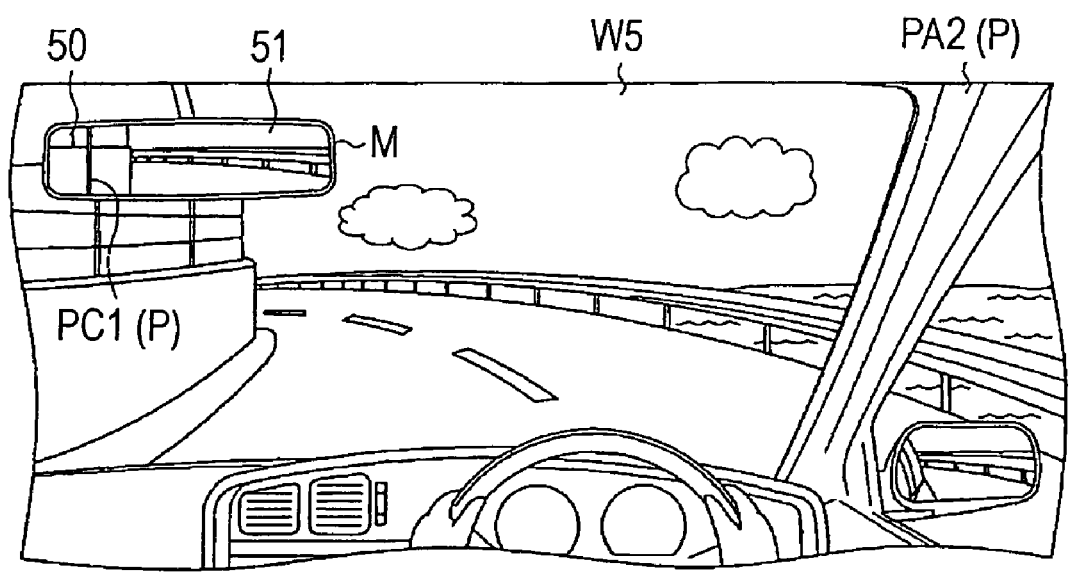
FIG. 12 is a view showing a frame format of an image of a blind spot in the rear-view mirror.

When the driver looks at the area behind the vehicle C1 or to the rear side of the vehicle C1 through the rear-view mirror M and when the left rear pillar PC1 is included within the range of view A1 of the rear-view mirror M, the rear projector 20C projects the blind spot image onto the left rear pillar PC1. Therefore, for example, a blind spot image 50, which is projected onto the left rear pillar PC1, will be seen in the rear-view mirror M as shown in FIG. 12. Therefore, the driver may view the area which is hidden as a blind spot by the left rear pillar PC1 as the blind spot image 50, so that the driver may determine whether another vehicle C2 is behind his/her vehicle C1. The blind spot image 50 is displayed in the rear-view mirror M, depending on the driver's eye direction, so that the real view and the view in the rear-view mirror M 51 are matched with each other and not twisted.

After the blind spot image is projected onto a pillar P, the system control section 10 determines whether the display should be terminated (Step S12). For example, when a predetermined time period has elapsed since turning the system "on" by operation of the start switch SW1, when the vehicle C1 has completed a lane change, when the vehicle C1 has passed an intersection or a curve, when the driver's eye direction is moved to within a predetermined angle range centered on the travel direction of the vehicle, or when the shift position of the vehicle C1 is moved to a position other than "reverse", it is determined that the display should be terminated. When it is determined that the display should be terminated (Step S12=YES), the procedure is terminated.

On the other hand, when it is determined in Step S12 (Step S12=NO) that the display should not yet be terminated, execution of the routine returns to Step S2 and the procedures in Steps S2 through S11 are repeated. When the driver's head position DH and/or the driver's eye direction are changed, the displayed image is changed on the basis of the newly detected head position DH and/or the eye direction.

The embodiment described above provides the following advantages.

1) When there is an area which is hidden as a blind spot created by the presence of a pillar P in the rear-view mirror M, the area in the mirror BM which is hidden as the blind spot is calculated on the basis of the driver's head position DH, the driver's eye direction, and the mirror angle. Then an area which corresponds to the area in the mirror BM which is hidden as the blind spot is clipped (cropped) from the image data G which is obtained from the blind spot camera 4 and the blind spot image 50 is output onto the medial surface of the pillar P. Therefore, when the driver looks at the area surrounding the vehicle C1 through the rear-view mirror M, the driver is able to view the area which is hidden as a blind spot created by the presence of the pillar P.

2) The blind spot image 50 is displayed on the pillar P which is included within the range of view A1 in the rear-view mirror M. Therefore, calculating processing and display processing are not executed for blind spot areas in the mirror BM corresponding to the pillars P which are not included within the range of view A1, thereby reducing the processing load on the driving support system 1.

3) When the navigation ECU 6 determines that the vehicle C1 is to change traffic lanes, the procedure for covering a blind spot created by the presence of the pillar P is started. Therefore, when the driver looks at the area behind the vehicle C1 or the area to the rear side of the vehicle C1 through the rear-view mirror M, the driver can see whether or not there is any other vehicle C2 behind or to the rear side of his/her vehicle C1.

4) When the obstacle detecting sensor 8 detects a vehicle C2 behind the vehicle C1, the virtual flat surface VP is set at the position of the other vehicle C2. Therefore, it is possible to project a clear image of an area centered on vehicle C2 onto the medial surface of the pillar P.

Further, many modifications of the embodiment described above are possible, including the following.

While in the embodiment described above, the head detecting sensor 3 is an ultrasound sensor, another type of sensor such as an image recognition sensor may be used instead. Further, a plurality of the head detecting sensors 3 are mounted near the driver's seat in the above-described embodiment. However, only one head detecting sensor may suffice. Further, the driver's head position may be detected by detecting the position of the headrest on the driver's seat or the position of the driver's seat.

While in the embodiment described above, the driver's head position DH is detected by the head detecting sensor 3, the position of another site on the driver's body (for example, position of the driver's eye) may be detected as the position of the driver.

The virtual flat surface VP may be set at a position of any reference object other than a pedestrian crosswalk. For example, the virtual flat surface VP may be set at the position of an object installed adjacent the road, such as a traffic light. For example, when the vehicle C1 has a radar or a sensor for calculating a relative distance between the vehicle C1 and an obstacle which is located in front of the vehicle C1 and when the radar or the sensor detects an obstacle such as a pedestrian, a bicycle, or another vehicle, the virtual flat surface VP may be set at the position of such a detected obstacle. Further, whether the detected obstacle is a pedestrian or a bicycle may be determined by conventional image processing, such as feature detection processing.

A plurality of the blind spot cameras 4 may be mounted for one pillar P to capture images, from different angles, of the area which is hidden as a blind spot by that one pillar P.

While in the embodiment described above, the projector 20 is mounted on the interior surface of the roof R of the vehicle C1, the projector 20 may be set at any position where the projector 20 is able to project the image onto the medial surface of the pillar P. For example, the projector 20 may be set on the upper side of the dash of the vehicle C1.

While in the embodiment described above, responsive to a determination that the driver is looking forward, images are projected onto the front pillars PA1 and PA2, an image may be projected onto only one of the pillars P. For example, the image may be projected onto the right front pillar PA2 which is closer to the driver or the pillar P onto which the image is projected may be appropriately changed on the basis of the driver's eye direction.

In the embodiment described above, when the driver looks at the area behind the vehicle C1 or the area to the rear side of the vehicle C1, images are projected onto the center pillars PB1 and PB2 and the rear pillars PC1 and PC2. However, an image may be projected onto only one of the pillars P. For example, the projection of images onto the center pillars PB1 and PB2 may be omitted or the pillar P on which the image is projected may be appropriately changed on the basis of the driver's eye direction.

In the embodiment described above, when at least one pillar among the center pillars PB1 and PB2 and the rear pillars PC1 and PC2 appears in the rear-view mirror M, the blind spot calculating section 13 calculates the area which is hidden as a blind spot by the pillar P. However, when it is determined that the driver is looking toward the rear-view mirror M, it may be possible to project images on all of the center pillars PB1 and PB2 and the rear pillars PC1 and PC2 on the basis of the driver's eye direction and the driver's head position.

While in the embodiment described above, the projector 20 projects the image onto the medial surface Pa of the pillar P a flat-screen display as display means may be mounted on the medial surface of the pillar P and the blind spot image 50 may be output by the display.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A driving support method for assisting a driver of a vehicle by displaying an image of an area which is hidden from the driver, as a blind spot, when looking from the driver's position, which blind spot is created by one of a plurality of pillars of the vehicle, using an imaging device which is mounted on or in the vehicle, the method comprising:
   detecting a position of the driver;
   detecting an angle of a mirror;
   determining the driver's eye direction;
   calculating a range of view which the driver is able to see in the mirror, on the basis of the detected position of the driver and the detected angle of the mirror;
   calculating the area which is hidden as the blind spot, when looking in the determined eye direction from the driver's position;
   displaying an image, corresponding to the calculated blind spot area on a medial side of the one pillar of the vehicle, which image is formed from image data captured by the imaging device;
   responsive to a determination that the driver's eye direction is toward the mirror, identifying one pillar, among the plurality of pillars, included within the calculated range of view and creating the blind spot in the mirror, on the basis of the detected position of the driver and the detected angle of the mirror and displaying the mirror blind spot image on the medial side of the identified one pillar; and
   responsive to a determination that the drivers eye direction is not toward the mirror, calculating the area which is hidden as a blind spot created by a pillar associated with the driver's eye direction, on the basis of the detected position of the driver, and displaying an image of the blind spot created by the associated pillar on the medial side of the associated pillar.

2. The driving support method according to claim 1 wherein the mirror is an interior rear-view mirror.

3. The driving support method according to claim 1 further comprising:
   determining that the driver intends a change in traffic lanes; and wherein
   responsive to a determination that the driver intends a change in traffic lanes, the image of the blind spot is output onto a pillar.

4. The driving support method according to claim 1 further comprising:
   detecting an obstacle located behind or to the rear side of the vehicle; and wherein responsive to detection of an obstacle which is located behind or to the rear side of the vehicle, setting a virtual flat surface at a position of the detected obstacle to convert the image data into coordinate values.

5. The driving support method according to claim 1, wherein:

responsive to a determination that the driver's eye direction is not toward the mirror and is forward with respect to the vehicle, calculating the area which is hidden as a blind spot created by at least one pillar located forward with respect to the vehicle, on the basis of the detected position of the driver, and outputting an image of the blind spot created by the at least one forward pillar onto the medial side of the at least one forward pillar; and responsive to a determination that the driver's eye direction is not toward the mirror and is backward with respect to the vehicle, calculating the area which is hidden as a blind spot created by at least one pillar, other than the at least one forward pillar on the basis of the detected position of the driver, and outputting an image of the blind spot created by the at least one other pillar onto the medial side of the at least one other pillar.

6. A driving support apparatus for assisting a driver of a vehicle by displaying an image of an area which is hidden from the driver, as a blind spot, when looking from the driver's position, which blind spot is created by the presence of one of a plurality of pillars of the vehicle, the apparatus comprising:

an imaging device mounted on or in the vehicle, for capturing an image including the blind spot;

driver's position detecting means for detecting a position of the driver;

mirror position detecting means for detecting an angle of a mirror;

eye direction detecting means for determining the driver's eye direction;

range of view calculating means for calculating a range of view which the driver is able to see in the mirror, on the basis of the detected position of the driver and the detected angle of the mirror;

blind spot calculating means for calculating the area which is hidden as a blind spot, when looking in the determined eye direction from the driver's position, which blind spot is created by one of the plurality of pillars;

image synthesis means for generating an image of the blind spot, using image data provided by the imaging device; and image outputting means for outputting the image of the blind spot onto a medial side of the one pillar of the vehicle; and wherein:

responsive to a determination by the eye direction detecting means that the driver's eye direction is toward the mirror, the blind spot calculating means identifies one pillar, among the plurality of pillars, included within the calculated range of view and creating the blind spot in the mirror, on the basis of the detected position of the driver and the detected angle of the mirror and the image outputting means outputs the generated blind spot image onto the medial side of the identified one pillar; and responsive to a determination by the eye direction detecting means that the driver's eye direction is not toward the mirror, the blind spot calculating means calculates the area which is hidden as a blind spot created by a pillar associated with the driver's eye direction, on the basis of the detected position of the driver, and the image outputting means outputs an image of the blind spot created by the associated pillar onto the medial side of the associated pillar.

7. The driving support apparatus according to claim 6 wherein the mirror is an interior rear-view mirror.

8. The driving support apparatus according to claim 6, further comprising:

vehicle condition determining means for determining that the driver intends a change in traffic lanes, wherein, responsive to a determination that a traffic lane change is intended, the image of the blind spot corresponding to the area hidden as a blind spot is output onto a pillar.

9. The driving support apparatus according to claim 6, further comprising:

obstacle detecting means for detecting an obstacle which is located behind the vehicle or to the rear side of the vehicle, wherein:

responsive to detection of an obstacle which is located behind or to the rear side of the vehicle, the image synthesis means sets a virtual flat surface at a position of the detected obstacle to convert the image data into coordinate values.

10. The driving support apparatus according to claim 6, wherein:

responsive to a determination by the eye direction detecting means that the driver's eye direction is not toward the mirror and is forward with respect to the vehicle, the blind spot calculating means calculates the area which is hidden as a blind spot created by at least one pillar located forward with respect to the vehicle, on the basis of the detected position of the driver, and the image outputting means outputs an image of the blind spot created by the at least one forward pillar onto the medial side of the at least one forward pillar; and responsive to a determination by the eye direction detecting means that the driver's eye direction is not toward the mirror and is backward with respect to the vehicle, the blind spot calculating means calculates the area which is hidden as a blind spot created by at least one pillar, other than the at least one forward pillar, on the basis of the detected position of the driver, and the image outputting means outputs an image of the blind spot created by the at least one other pillar onto the medial side of the at least one other pillar.

* * * * *